Patented Jan. 3, 1939

2,142,162

UNITED STATES PATENT OFFICE 2,142,162

SECONDARY ALKYL MONOSULPHONATES

James Herbert Werntz, Wilmington, Del., assignor to E. I. du Pont de Nemours & Company, Wilmington, Del., a corporation of Delaware No Drawing. Application December 18, 1937, Serial No. 180,547

7 Claims. (Cl. 260—513)

This invention relates to new chemical compounds, their methods of production, and their technical uses. More particularly this invention relates to water-soluble, acid stable, capillary active bodies which are secondary alkyl monosulphonates. In a more specific form this invention pertains to monosulphonates which contain from 10 to 16 carbon atoms and have the general formula:

wherein X represents a sulphonate group, and R and R' stand for saturated aliphatic hydrocarbon radicals, each of which contain at least 2 carbon atoms and which together with the carbon atom to which the sulphonate group is attached form a straight chain of at least 10 carbon atoms.

This invention has as an object the preparation of a number of new chemical compounds which have surface active properties. A further object is to manufacture these new compounds by novel and easily conducted processes which give high yields of relatively high quality products. A still further object is to apply these new compounds in various connections wherein surface active compounds are commonly employed. Other objects will appear hereinafter.

I have found that the long chain secondary alkyl sulphonates in which the sulphonate groups are attached to carbon atoms which are not adjacent to terminal carbon atoms are not only surface active but are much more soluble in water and organic solvents and for specific applications, such as for use in the wetting of various materials, are much superior to the primary alkyl sulphonates. I have also found that maximum wetting efficiency is found in the secondary alkyl sulphonates which contain from 10 to 16 carbon atoms and in addition have at least 10 carbon atoms in a straight chain. I have discovered that in general the closer the sulphonate group is to the middle of the straight carbon chain the more efficient are the products as wetting agents. There may be some side chains in the molecule, preferably methyl or ethyl groups, but the molecule must not be so highly branched that less than 10 carbon atoms are in a straight chain. This invention pertains to secondary alkyl monosulphonates of less than 17 carbon atoms in which at least 10 carbon atoms are in a straight chain, defined by the general formula:

in which X represents a sulphonate group and R and R' are saturated aliphatic hydrocarbon radicals having at least 2 carbon atoms in a straight chain. In its preferred form my invention pertains to the symmetrical secondary alkyl monosulphonates in which the aliphatic radicals R and R' are identical.

The following examples illustrate but do not limit the invention. All parts are given by weight.

Example I

*Sodium pentadecyl-8 sulphonate.*—Eighty parts of sodium pentadecyl-8 sulphate, 150 parts of sodium sulphite, 470 parts of water, 2 parts of aniline and 2 parts of sodium di-hydrogen phosphate were charged into an autoclave and heated with stirring for 16 hours at 130–140° C. The product was a dark brown liquid and consisted of 2 layers, an upper oily layer and a lower water layer. The oily layer was mixed with water and methanol, made alkaline, and extracted with petroleum ether to remove water insoluble products. The extracted solution was evaporated to dryness, and 20 parts of a dark brown solid was obtained. Dilute aqueous solutions of this product wet skeins of cotton thread very rapidly when tested by the method of Draves and Clarkson (American Dyestuffs Reporter 20, 201 (1931)).

Example II

*Sodium pentadecyl-4 sulphonate.*—Sodium pentadecyl-4-sulphate, prepared by the sulphation of pentadecanol-4 by means of chlorosulphonic acid followed by neutralization with sodium hydroxide solution, was reacted with sodium sulphite under the conditions described in Example I. The product was isolated as described for the product of Example I and was obtained as a brownish colored solid. Sodium pentadecyl-4 sulphonate is an efficient wetting agent especially for cotton fibers.

Example III

*Sodium pentadecyl-8 sulphonate.*—Thirty-six parts of concentrated nitric acid of specific gravity 1.42 was placed in a 3-necked round bottom flask equipped with a stirrer, thermometer, and dropping funnel. The nitric acid was heated and stirred to 50–60° C., and a few drops of dodecyl mercaptan added to initiate the reaction. After stirring for ½ hour reaction set in, and brown fumes were given off. Twenty parts of pentadecyl-8 mercaptan of 80% purity was added slowly from the dropping funnel. After all the mercaptan had been added it was warmed gradually, and the temperature raised to that of the steam bath where it was heated for one hour. Fifty parts of water were added, and then a solution of about 20 parts of sodium hydroxide in 50 parts of water was slowly introduced into the reaction mixture. The product was precipitated, filtered, and washed with small amounts of water. The product was dissolved in a mixture containing about 120 parts of methanol and 880 parts of water and extracted with ethyl ether. Three ether extractions removed about 3 parts of impurity, and the product was isolated by removal of the solvents on the steam bath. Thirty-eight parts of a white solid was thereby obtained which sulphur analysis indicated to be sodium pentadecyl-8 sulphonate of a purity of 52%. This material is an efficient wetting agent for cotton textiles. The sodium pentadecyl-8 sulphonate was found to be soluble in petroleum ether, and the above product was, therefore, extracted with petroleum ether in order to separate it from the inorganic salts. On evaporation of the petroleum ether a light yellow solid was obtained which sulphur analysis indicated to be sodium pentadecyl-8 sulphonate of a purity of 85%. Sodium pentadecyl-8 sulphonate is an excellent detergent and is much superior to soap in hard water.

*Example IV*

Sodium pentadecyl-8 sulphonate.—Pentadecyl-8 mercaptan was oxidized with concentrated nitric acid in the same manner as described in Example III. The excess of nitric acid was removed on the steam bath, and the product dissolved in water and neutralized with sodium hydroxide solution using phenolphthalein as the indicator. The water layer was next evaporated on the steam bath, and a pasty solid obtained. The product was dissolved in ethyl ether, filtered, and the ether evaporated. The same procedure was repeated with petroleum ether, and the product finally dried in a vacuum desiccator at 100° C. The yellow colored solid analyzed 8.9% sulphur indicating a purity of 87.3% of sodium pentadecyl-8 sulphonate.

*Example V*

Mixed sodium hexadecyl sulphonates.—Cetane was chlorinated using a 150 watt incandescent bulb to catalyze the reaction. The product was distilled twice, and a fraction isolated boiling 173–177° C. at 11 mm. which analyzed 13.7% chlorine. The calculated value for $C_{16}H_{33}Cl$ is 13.63% chlorine. The refractive index of this fraction was 1.4487 at 20° while that of hexadecyl-1 chloride was found to be 1.4502. This fraction solidified at about −30° C. whereas hexadecyl-1 chloride freezes at 7° C. The mixed hexadecyl chlorides were converted to mixed hexadecyl mercaptans, and a fraction obtained which boiled 145–152° C. at 3 mm. and analyzed 81% mercaptan.

Nine parts of the mixed hexadecyl mercaptans was dissolved in 79 parts of carbon tetrachloride and placed in a round bottom 3-necked flask equipped with a stirrer, thermometer, and dropping funnel. The reaction mixture was warmed to 40–50° C., and 21 parts of nitric acid of 1.42 specific gravity was added slowly. After all the nitric acid had been added and the vigorous evolution of fumes of nitrogen oxides had ceased, the temperature was raised by means of the steam bath, and the solvent removed under a vacuum of about 25 mm. The residue was dissolved in water, neutralized with a 4% sodium hydroxide solution, and extracted thoroughly with ethyl ether. The aqueous solution was filtered and evaporated yielding 9 parts of a soft brownish-colored waxy solid. It analyzed 9.34% sulphur indicating a purity of about 95.7% of sodium hexadecyl sulphonates. This product is a detergent and is a good wetting agent for cotton fibers.

In the preparation of the sulphonates of the present invention I may employ any secondary mercaptan of 10 to 16 carbon atoms wherein the sulphhydro group is attached to a carbon atom other than the carbon atom which is adjacent to a terminal carbon atom. I prefer to use the following mercaptans: pentadecyl-8 mercaptan, pentadecyl-7 mercaptan, pentadecyl-6 mercaptan, pentadecyl-5 mercaptan, pentadecyl-4 mercaptan, pentadecyl-3 mercaptan, tridecyl-7 mercaptan, dodecyl-6 mercaptan, 7-ethyl 2-methyl undecyl-4 mercaptan, and 3,9-diethyl undecyl-6 mercaptan. I may also use 3-ethyl decyl-6 mercaptan, 3-ethyl undecyl-6 mercaptan, undecyl-6 mercaptan, undecyl-4 mercaptan, 2-methyl undecyl-5 mercaptan, etc. Sodium pentadecyl-8 sulphonate is the preferred product.

I may employ any mixture of secondary mercaptans containing 10 to 16 carbon atoms with the sulphhydro group attached to a carbon atom other than the one adjacent to a terminal carbon atom as intermediates for conversion to the sulphonates. Further in the practice of my invention, I may employ mixtures of secondary mercaptans which contain at least 50% of a secondary mercaptan of 10 to 16 carbon atoms as above described.

The capillary active products of this invention are preferably obtained by treating a secondary mercaptan of 10 to 16 carbon atoms wherein the sulphhydro group is attached to a carbon atom other than the one adjacent to the terminal carbon atom with an oxidizing agent such as nitric acid, potassium permanganate, hydrogen peroxide, potassium dichromate, etc. Another suitable method is the reaction of an alkyl halide, such as tridecyl-7 bromide, or an alkyl sodium sulphate as, for example, pentadecyl-6 sodium sulphate with sodium sulphite. Less preferred methods for the preparation of the sulphonates are the oxidation of thio-sulphuric acid esters, the treatment of a suitable secondary alcohol with methane disulphonic acid or a secondary olefin with a strong sulphonating agent such as concentrated sulphuric acid at temperatures above 100° C.

In carrying out the oxidation of the mercaptans with nitric acid it is frequency desirable to employ an inert solvent such as carbon tetrachloride, trichloro-ethylene, etc. It is sometimes necessary to initiate the reaction by the addition of a small amount of fuming nitric acid and warming to about 75° C. Reaction is indicated by the vigorous evolution of fumes of the oxides of nitrogen. It is frequently desirable to oxidize a small amount of the mercaptan with a small amount of nitric acid, and then after reaction has started to add additional quantities of mercaptan and nitric acid slowly to the reaction mixture. While temperatures ranging from 0° C. to 100° C. have been used for the nitric acid oxidation, I may carry out the reaction below 0° C. and above 100° C. However, I prefer to use temperatures of about 40–75° C. At low temperatures the reaction becomes sluggish while at high temperatures the reaction is difficult to control.

The secondary monosulphonic acids described herein may be used as such, but generally they are converted to their alkali metal salts by neutralization with an alkali metal hydroxide, such as sodium hydroxide. The potassium, ammonium, calcium, and magnesium salts may also be prepared and used. Suitable salts of the secondary sulphonic acids described herein, may also be made from such amines as dimethylamine, ethylamine, diethanolamine, butylamine, glucamine, methyl glucamine, pyridine, piperidine, cyclohexylamine, aniline, toluidine, etc. In this application when I mention a secondary alkyl monosulphonate I intend to refer generically to the sulphonate irrespective of how or whether the acid hydrogen of the sulphonate group may have been neutralized.

The new compositions covered in this case belong to the class of surface active or capillary active materials in that they have colloidal properties and may, therefore, be advantageously used in any process involving wetting, penetrating, deterging, dispersing, emulsifying, frothing, foaming, and kindred phenomena. These compositions may be employed in pure or standardized form, and, if desired, in conjunction with known processing or treating agents. They may be used by themselves or in combination with other surface active agents in any relation in which surface active agents having colloidal properties have heretofore been used.

The above description and examples are to be taken as illustrative only. Any variation or departure therefrom which conforms to the spirit of the invention is intended to be included within the scope of the claims.

I claim:

1. Secondary alkyl monosulphonates containing less than 17 carbon atoms in which at least 10 carbon atoms are in a straight chain having the general formula:

in which R and R' are saturated aliphatic hydrocarbon radicals containing at least 2 carbon atoms and X represents a sulphonate group.

2. A process for producing the secondary alkyl monosulphonates defined in claim 1 which comprises oxidizing higher secondary alkyl mercaptans containing less than 17 carbon atoms in which at least 10 carbon atoms are in a straight chain having the general formula:

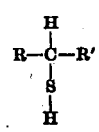

in which R and R' are saturated aliphatic hydrocarbon radicals containing at least 2 carbon atoms.

3. Secondary alkyl monosulphonates containing from 10 to 16 carbon atoms in a straight chain having the general formula:

in which R and R' are saturated straight chain aliphatic hydrocarbon radicals containing at least 2 carbon atoms and X stands for a sulphonate group.

4. Alkali metal salts of symmetrical secondary alkyl monosulphonic acids containing at least 11 and not more than 15 carbon atoms having the general formula:

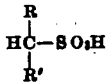

in which R and R' represent the same saturated straight chain aliphatic hydrocarbon radicals.

5. A pentadecyl-8 sulphonate.

6. An alkali metal salt of pentadecyl-8 sulphonic acid.

7. Sodium pentadecyl-8 sulphonate.

JAMES HERBERT WERNTZ.